United States Patent [19]

McAtee

[11] 4,020,986
[45] May 3, 1977

[54] CONSOLE CADDY

[76] Inventor: James L. McAtee, 4053 Wynn Road, Bellingham, Wash. 98225

[22] Filed: May 2, 1975

[21] Appl. No.: 573,923

[52] U.S. Cl. .......................... 224/42.42 R; 62/457; 206/139; 220/9 F
[51] Int. Cl.² .......................................... B60R 7/04
[58] Field of Search ............ 224/29 R, 29 G, 42.11, 224/42.42 R; 296/37 R; 62/457, 463, 465, 244, 372, 377; 206/139, 541, 545; 220/9 F; 108/44; 312/138 A

[56] References Cited

UNITED STATES PATENTS

| | | | |
|---|---|---|---|
| 2,034,478 | 3/1936 | Levy | 62/463 X |
| 2,216,330 | 10/1940 | Stover | 62/372 |
| 2,645,332 | 7/1953 | Martin et al. | 206/545 |
| 3,136,461 | 6/1964 | Gregg | 224/42.42 R |
| 3,331,494 | 7/1967 | Gregg | 224/42.42 R |
| 3,401,535 | 9/1968 | Palmer | 62/457 |
| 3,670,936 | 6/1972 | Pronovost | 224/42.42 R |
| 3,791,547 | 2/1974 | Branscum | 220/9 F X |

*Primary Examiner*—Robert J. Spar
*Assistant Examiner*—Winston H. Douglas

[57] ABSTRACT

A portable storage assembly for holding accessories in a vehicle has ambient and refrigerated spaces.

1 Claim, 4 Drawing Figures

CONSOLE CADDY

BACKGROUND OF THE INVENTION

The average motor vehicle is poorly equipped to handle the numerous accessories that have become quite standard equipment for travel especially on long trips where children are involved.

The average vehicle, beyond a glove compartment, the flat surface on top of the dash board and the floor, does not offer any storage for coffee cups, cigarettes, canned or bottled beverages, candy bars and fruit.

To place these items in the aforementioned storage areas without a means to contain them is to invite a small disaster and much inconvenience from spilled coffee, tepid beverages and melting chocolate. There is also the feature of safety when the driver is not giving full time and attention to the road while rummaging for any of the items adrift in the vehicle.

U.S. Pat. No. 3,207,567 addresses itself to the problem of providing a support for various items in a vehicle but does not teach or claim the areas essential to the instant invention.

SUMMARY OF THE INVENTION

This invention deals generally with storage assemblies for vehicles and more specifically with a portable storage assembly providing ambient and refrigerated space.

It is an object of this invention to provide portabel storage assembly which is easily installed and removed in a vehicle.

It is also an objective of this invention to provide a storage assembly for accessories in a vehicle which holds the accessories against tipping and sliding but will allow the accessories to be easily removed.

It is a further object of this invention to provide a storage assembly which may be attached to a flat or irregular surface.

It is another object of this invention to provide a storage assembly having ambient and refrigerated spaces.

These and other objects and advantages will become apparent from the detailed description and the drawings froming a part thereof in which.

DESCRIPTION OF THE PREFERRED EMBODYMENT

Figure 1:
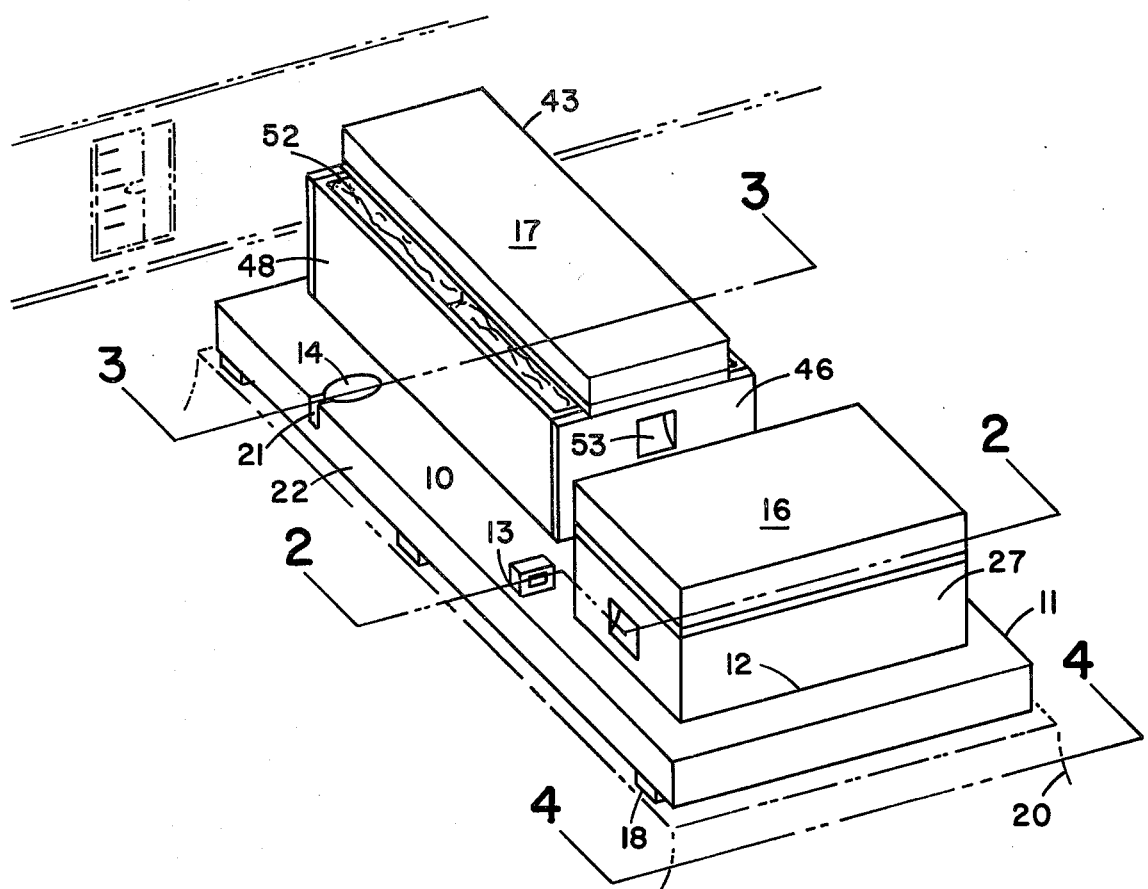
FIG. 1 is an elevational side view of the preferred embodyment

As shown in FIG. 1 a portable storage assembly 10 for holding accessories in a vehicle comprises a planar pallet 11 made of suitable material such as foamed plastic, wood, metal or paper, has a plurality of recesses 12, 13 and 14 extending inwardly from the top surface 15 and a plurality of compartmented, refrigerated box assemblies 16 and 17 removably engaged therein.

The pallet 11 has a plurality of attach means 18 fastened by suitable means to the bottom surface 19 for removably attaching the pallet 11 to the vehicle. As shown in FIG. 1 the pallet 11 is attached to the console 20 of a vehicle commonly described as a "Van" but may be attached to the floor or any other suitable area in any type vehicle.

The attach means 18 may be of pressure sensitive adhesive tape, pile loop fabric known as "Velcro", suction cups, magnets or any other suitable means.

As shown in FIG. 1 the recesses 12, 13 and 14 are formed to hold specific items such as cups, cigarettes, matches and the box assemblies 16 and 17, however additional recesses for additional items may be added.

The recesses 12, 13 and 14 engage their specific items close enough to prevent tipping or sliding and may extend thru the pallet 11 or only to a depth which will facilitate easy removal of the item. In the instance of 14 a slot 21 extends thru the side wall 22 to accomodate the cup handle.

The use of foamed plastic in the pallet 11 provides a good insulator for holding the heat or cold of some of the items.

Figure 2:
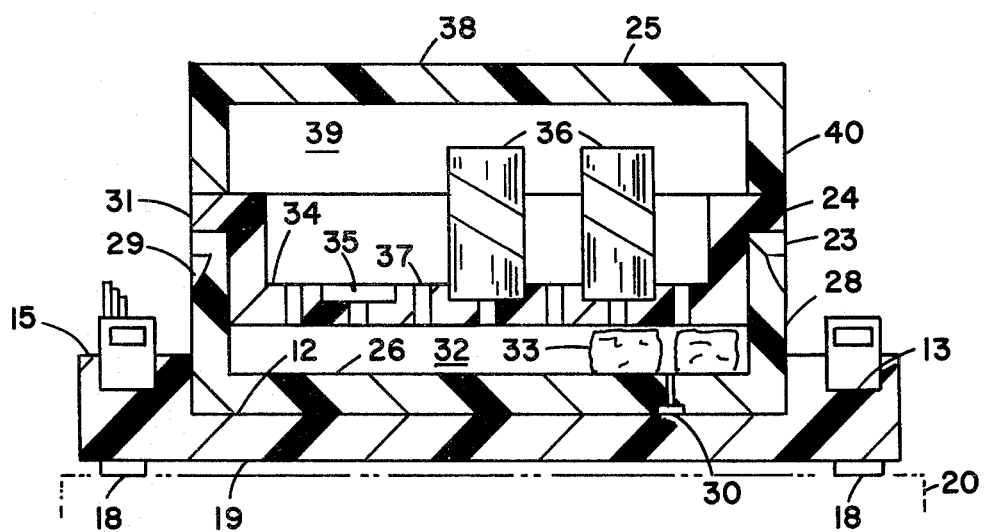
FIG. 2 is a sectional view taken along line 2—2 in FIG. 1

As shown in FIGS. 1 and 2 a first box assembly 16 comprises a lower compartment 23, an internal shelf 24 and a top cover 25.

The lower compartment 23 has a bottom 26, two sides 27 and two ends 28. An inwardly extending recess 29 in each end 28 form hand holds for lifting or carrying the assembled box 16. A drain means 30 in the bottom 26 may be provided.

The internal shelf 24 is removably engaged inside the lower compartment 23 and is suspended on an outwardly extending flange 31. The shelf 24 extends downwardly to a point less than the full depth of the lower compartment 23 to form a space 32 where ice 33 may be placed.

The top 34 of the shelf 24 has a plurality of recesses 35 extending inwardly therein where receptacles 36 such as cans or bottles may be removably engaged, and a plurality of apertures 37 extending therethrough which allows the cold air from the ice 33 to pass up around the receptacles 36. The top cover 25 having an upper surface 38, two sides 39 and two ends 40 rest on the outwardly extending flange 31.

Box assembly 16 is shown constructed of foamed plastic such as styrofoam but any suitable material such as wood, metal or paper may be used.

Figure 3:
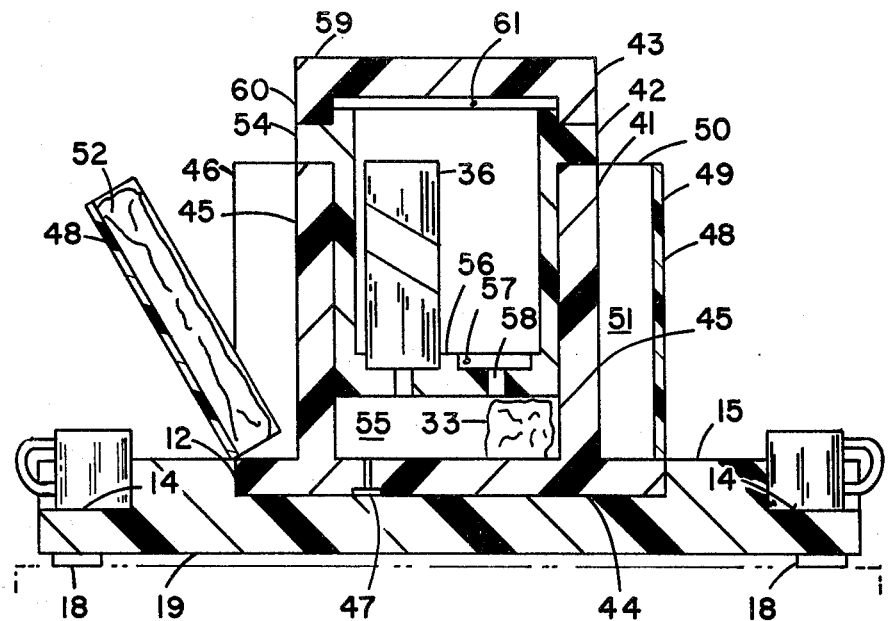
FIG. 3 is a sectional view taken along line 3—3 in FIG. 1

As shown in FIGS. 1 and 3, a second box assembly 17 has a lower compartment 41, an internal shelf 42, and a top cover 43.

The lower compartment 41 has a bottom 44, two sides 45 and two ends 46. A drain means 47 may be provided in the bottom 44. The ends 46 and bottom 44 extend outwardly beyond the sides 45 to removably hold a container 48.

The container 48 has a bottom 49 and two upwardly extending sides 50 which are slidably engaged by the ends 46 and abut the sides 45 to form a storage space 51 between the bottom 49 and the sides 44 wherein articles 52 such as sandwiches may be stored. The container 48 may be pivoted outwardly to assist in the removal of the articles 52.

An inwardly extending recess 53 in each end 46 form hand holds for lifting or carrying the assembled box 17.

The internal shelf 42 fits inside the lower compartment 41 and is suspended on an outwardly extending flanged 54. The shelf 42 extends downwardly to a point less than the full depth of the lower compartment 41 to form a space 55 where ice 33 may be placed. The top 56 of the shelf 42 has a plurality of recesses 57 extending inwardly wherein where receptacles 36 such as cans or bottles may be removably engaged, and a plurality of apertures 58 extending therethrough which allows the cold air from the ice 33 to pass up around the receptacles 36. The top cover 43 having an upper surface 59, two sides 60 and two ends 61, rests on the outwardly extending flange 54.

Box assembly 17 is shown constructed of a foamed plastic such as styrofoam but any suitable material such as wood, metal or paper may be used.

Figure 4:
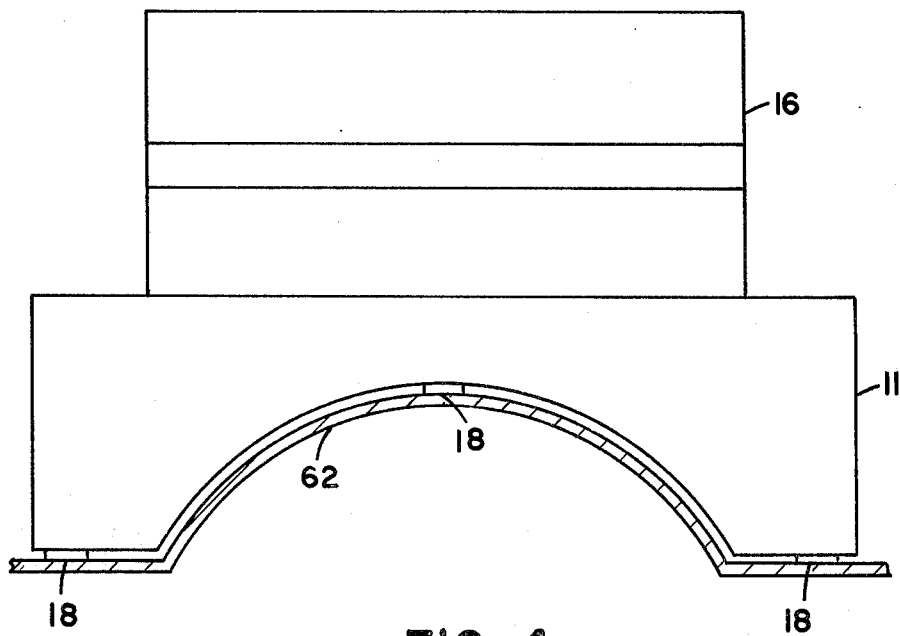
FIG. 4 shows a second embodyment.

As shown in FIG. 4 the bottom surface 19 of the pallet 11 may be configured to rest on an irregular surface 62 such as a drive shaft tunnel.

The refrigerated boxes 16 and 17 are not limited to holding receptacles 36 but may be also used for items such as fruit.

I claim:

1. A portable storage assembly for holding accessories in a vehicle comprising:
   a planar pallet having a plurality of recesses extending inwardly from its top surface;
   a plurality of attach means joined to the bottom surface of said planar pallet whereby said pallet may be removably attached to said vehicle;
   a first box assembly removably engaged in one said recess, wherein said first box assembly comprises:
   a lower compartment having a bottom, two sides, two ends and an inwardly extending recess in each said end forming a hand hold whereby said box assembly may be lifted and carried;
   an internal shelf removably suspended inside said lower compartment on an outwardly extending flange, said shelf extending downwardly to a point less than the full depth of said lower compartment to form a space wherein ice may be placed, said internal shelf having a plurality of recesses in its top surface wherein receptacles may be removably engaged, said internal shelf having a plurality of apertures therethrough whereby cold air from said ice may pass up around said receptacle; and
   a top cover having a top surface, two sides and two ends resting on said outwardly extending flange of said internal shelf; and
   a second box assembly removably engaged in one other said recess, wherein said second box assembly comprises:
   a lower compartment having a bottom, two sides, two ends and an inwardly extending recess in each said end forming a hand hold whereby said box assembly may be lifted and carried, said bottom and said ends extend outward of said sides to hold a side container in removable engagement;
   an internal shelf removably suspended inside said lower compartment on an outwardly extending flange, said shelf extending downwardly to a point less than the full depth of said lower compartment to form a space wherein ice may be placed, said internal shelf having a plurality of recesses in its top surface wherein receptacles may be removably engaged, said internal shelf having a plurality of apertures therethrough whereby cold air from said ice may pass up around said receptacles; and
   a top cover having a top surface, two sides and two ends resting on said outwardly extending flange of said internal shelf, and wherein said side container comprises:
   a bottom; and
   two upwardly extending sides whereby when said container is engaged by said ends of said lower compartment with said container sides abutting said sides of said lower compartment a storage space is formed.

* * * * *